(12) United States Patent
Janning

(10) Patent No.: US 8,360,229 B2
(45) Date of Patent: Jan. 29, 2013

(54) ISOLATING PLANT AND ASSOCIATED ISOLATING METHOD

(75) Inventor: Hermann Janning, Lingen (DE)

(73) Assignee: Areva NP GmbH, Erlangen (DE)

( * ) Notice: Subject to any disclaimer, the term of this patent is extended or adjusted under 35 U.S.C. 154(b) by 0 days.

(21) Appl. No.: 13/345,874

(22) Filed: Jan. 9, 2012

(65) Prior Publication Data
US 2012/0118702 A1 May 17, 2012

Related U.S. Application Data

(63) Continuation of application No. PCT/EP2010/003838, filed on Jun. 28, 2010.

(30) Foreign Application Priority Data

Jul. 7, 2009 (EP) .................................. 09 008 856

(51) Int. Cl.
*B65G 47/30* (2006.01)
(52) U.S. Cl. .................... 198/459.1; 198/461.1; 198/493
(58) Field of Classification Search ............... 198/459.1, 198/459.8, 461.1, 461.2, 461.3, 493
See application file for complete search history.

(56) References Cited

U.S. PATENT DOCUMENTS

| | | | | |
|---|---|---|---|---|
| 5,022,142 A | * | 6/1991 | Widener | 29/723 |
| 5,845,784 A | * | 12/1998 | Gray et al. | 209/577 |
| 5,941,365 A | * | 8/1999 | Ritter | 198/380 |
| 5,971,134 A | * | 10/1999 | Trefz et al. | 198/460.1 |
| 6,024,208 A | * | 2/2000 | Chooi et al. | 198/534 |
| 6,843,361 B2 | * | 1/2005 | Maingonnat et al. | 198/456 |
| 7,746,486 B2 | | 6/2010 | Ferlet | |

FOREIGN PATENT DOCUMENTS

| | | |
|---|---|---|
| DE | 42 22 972 A1 | 1/1993 |
| DE | 4124278 A1 * | 1/1993 |
| DE | 42 13 180 A1 | 10/1993 |
| JP | 58-69614 A | 4/1983 |
| JP | 60-122620 A | 7/1985 |
| WO | 2007/045625 A1 | 4/2007 |

OTHER PUBLICATIONS

International Search Report of PCT/EP2010/003838, Dated Sep. 22, 2010.
International Preliminary Report on Patentability of PCT/EP2010/003838, Dated Sep. 15, 2011.

* cited by examiner

*Primary Examiner* — Mark A Deuble
(74) *Attorney, Agent, or Firm* — Laurence A. Greenberg; Werner H. Stemer; Ralph E. Locher

(57) ABSTRACT

An isolating plant for isolating objects, in particular nuclear fuel pellets, fed in stacks, includes a feeding conveyor belt and an output conveyor belt, permitting a particularly reliable and interruption-free isolation of the fed objects simultaneously with a high processing speed. A delivery area, situated between the feeding conveyor belt and the output conveyor belt, includes a separating device driven by a pressure gas, in which the fed objects are separated from each other during operation of the plant by purposeful pressure-gas pulses in order to be delivered one by one to the output conveyor belt. A method for isolating nuclear fuel pellets is also provided.

9 Claims, 3 Drawing Sheets

ISOLATING PLANT AND ASSOCIATED ISOLATING METHOD

CROSS-REFERENCE TO RELATED APPLICATION

This is a continuation, under 35 U.S.C. §120, of copending International Application No. PCT/EP2010/003838, filed Jun. 28, 2010, which designated the United States; this application also claims the priority, under 35 U.S.C. §119, of European Patent Application EP 09 008 856.8, filed Jul. 7, 2009; the prior applications are herewith incorporated by reference in their entirety.

BACKGROUND OF THE INVENTION

Field of the Invention

The invention relates to an isolating plant for isolating objects, in particular nuclear fuel pellets, fed in stacks. The isolating plant includes a feeding device, in particular a feeding conveyor belt, and an output device, in particular an output conveyor belt. The invention also relates to an associated method.

The nuclear fuel necessary for operating a nuclear plant is usually provided in the form of so-called pellets or tablets having a substantially cylindrical shape. Before such fuel pellets which are formed, for example, of enriched uranium oxide or another fissionable material, are inserted into a fuel-rod cladding tube provided for placement in a reactor core, the individual pellets are usually thoroughly inspected. The fuel pellets are preferably fed to an inspection line of an automated inspection device for that purpose. Fuel pellets having dimensions, quality or other physical properties which do not fulfill the specified requirements will be treated as rejects and will be sorted out.

Usually, the fuel pellets are fed to the inspection device in groups in the form of coherent columns or stacks and have to be isolated before entering the inspection line. That is effected, for example, through the use of an isolating plant known from German Published Patent Application DE 42 13 180 A1, which includes two synchronously circulating conveyor belts oriented towards each other in a V-shape, on which the fuel pellets to be isolated are fed in stacks to an isolating zone. There, above the two feeding conveyor belts, there is a deflection pulley of a third conveyor belt installed in a "suspended" configuration and provided with pushing pins protruding outwards.

With a suitable coordination of the circulating speeds of the two feeding conveyor belts disposed in the V-shape and the circulating speed of the output conveyor belt provided with the pushing pins and disposed above them, the pushing pins, while circulating around the deflection pulley, move between the individual pellets of the fed stack and thus bring about the desired separation. Then, the isolated pellets, guided on sliding rails, are further conveyed through the use of the pushing pins of the output conveyor belt and fed, for example, to an inspection line. The pushing pins located between the individual pellets at the same time prevent the pellets from approaching each other again in an undesired manner.

The known isolating plant has a number of disadvantages: The proper delivery and isolation of the fuel pellets requires an extremely precise coordination of the circulating speeds of the conveyor belts involved, with intermediate acceleration phases and braking processes. For that purpose, the instantaneous positions of the pellets and the pushing pins have to be detected with relatively high precision and processed in real time in a control unit with complex control logics, in particular in the case of a varying dimensioning of the pellets. The selection of drive motors for the conveyor belts must also be effected relatively accurately and quickly, which entails a considerable amount of work. Nevertheless, errors occur again and again in the isolation, which in the worst case may lead to a standstill of the installation and will then make a manual intervention necessary.

A relatively frequent occurrence is so-called double isolations, i.e. instead of a single fuel pellet, two fuel pellets at a time are placed in a section between two successive pushing pins. In the following inspection, those pellets are rejected as scrap, and for each rejected unit, all necessary production steps have to be passed again, which causes corresponding work and expenses.

The above-mentioned problems will occur to a particularly high extent, if different pellet types with different masses and dimensions and, therefore, friction and gliding properties of different degrees, are to be processed in the same plant.

SUMMARY OF THE INVENTION

It is accordingly an object of the invention to provide an isolating plant of the above-mentioned type as well as an associated method, which overcome the hereinafore-mentioned disadvantages of the heretofore-known devices and methods of this general type and with which a particularly reliable and interruption-free isolation of objects fed in groups is possible with a high processing speed at the same time.

With the foregoing and other objects in view there is provided, in accordance with the invention, an isolating plant for isolating nuclear fuel pellets fed in stacks. The isolating plant comprises a feeding device including a feeding conveyor belt, an output device including an output conveyor belt, a delivery area disposed between the feeding device and the output device, and a separating device disposed in the delivery area, driven by a pressure gas and configured to separate the fed nuclear fuel pellets from each other during operation of the plant with pressure-gas pulses and to deliver the nuclear fuel pellets one by one to the output device.

The separation of the objects and their delivery from one conveyor belt to the other is, therefore, advantageously effected purely pneumatically, i.e. without direct mechanical interaction. It was surprisingly discovered that particularly when charging the separating device with pressure-gas pulses of a relatively short duration, a particularly reliable isolation could be achieved without excessive flow turbulences or swirls occurring. In particular, when processing nuclear fuel pellets, this avoids radioactively loaded dust being detached from the pellet surface and whirled up and then carried into the surrounding atmosphere.

In accordance with another feature of the invention, the separating device is connected to a pressure-gas source over a pressure-gas line, and a valve is disposed in the pressure-gas line and synchronized by a synchronization device with the movement of the objects on the feeding conveyor belt.

Advantageously, the pressure-gas is compressed air, which is brought to the necessary operating pressure through the use of a compressor. If necessary, an intermediate storage of the compressed air in a compressed-air accumulator or tank can be provided. Alternatively, however, other pressurized gases can also be used, unless they chemically react in an undesired manner with the objects to be isolated.

In accordance with a further feature of the invention, the separating device includes a conveying tube, through which the objects to be isolated are passed during operation of the plant and which includes a number of pressure-gas distribution slots formed into the tube wall and connected to the pressure-gas line. Expediently, the shape and dimensions of the inner cross-section of the conveying tube are adapted to the objects to be isolated in such a way that the latter can, on one hand, slide through the conveying tube without considerable frictional resistance, but in such a way that, on the other hand, no considerable gap remains between the outside of each object and the inner wall of the conveying tube. That means that the objects to be isolated substantially seal the conveying tube in a gas-tight manner. A pressure-gas cushion, applied through the pressure-gas distribution slots, accelerates each of the objects, like a projectile in a rifle barrel, and catapults it out of the conveying tube.

In accordance with an added feature of the invention, the pressure-gas distribution slots are disposed in an end zone of the conveying tube and the end zone faces the output conveyor belt. Expediently, they are disposed and dimensioned in such a way that the applied pressure-gas pulses always accelerate, in a conveying direction, only the front-most object of a fed stack, in the conveying direction, thus separating it from the stack.

In accordance with an additional feature of the invention, advantageously the valve disposed in the pressure-gas line is a high-speed solenoid valve, with which pressure-gas pulses of a duration in the range between 1 ms and 50 ms can be realized. As mentioned before, in this way it is already possible with a relatively low gas pressure of, for example, 0.4 bar or a little more, to achieve a reliable separation of the respective front-most object from the rest of the stack, without a risk of contaminating the pressure-gas or the ambient air with radioactive dust or the like.

Since the remaining stack has a relatively large mass in comparison with the individual objects and is, furthermore, continuously pushed into the conveying tube with a certain force, any recoil effects on the inserted stack can be neglected.

In accordance with yet another advantageous feature of the invention, the synchronization device includes a light barrier, having a light path which is interrupted by the objects fed to the conveying tube or located therein, as soon as they reach or pass a corresponding position. This triggers an electrical signal, which is converted, in an associated control unit, into an opening signal for opening the valve disposed in the pressure-gas line, in order to initiate the desired pressure pulse in the separating device in this way. In an advantageous development, the opening signal is delayed, as required, and passed on to the valve only after the position of the pushing pins on the output conveyor belt have been detected as being correct. Preferably, the light barrier is disposed in an end zone of the conveying tube facing the output conveyor belt and preferably, as viewed in conveying direction, shortly behind the pressure-gas distribution slots, so that the corresponding object interrupts the light barrier shortly before exiting from the conveying tube. It then needs to be transported by the pressure pulse triggered in this way over a relatively short distance only within the conveying tube up to its complete ejection.

As already stated above, in a preferred development, the control or regulating algorithm for the valve control, implemented in the control unit, can also take into account the instantaneous position of the pushing pins fixed on the output conveyor belt. For this purpose, the synchronization device advantageously includes a position detector, e.g. a second light barrier, detecting the instantaneous position of the pushing pins.

With the objects of the invention in view, there is also provided a method for isolating nuclear fuel pellets. The method comprises feeding the nuclear fuel pellets in stacks on a feeding conveyor belt of a feeding device, pushing a stack of the nuclear fuel pellets through a conveying tube having a tube wall with a number of pressure-gas distribution slots connected to a pressure-gas line, separating the nuclear fuel pellets from the stack by charging the pressure-gas distribution slots with pressure-gas pulses, and individually accelerating the nuclear fuel pellets along a longitudinal direction of the conveying tube.

In accordance with another mode of the invention, in this connection, it is particularly advantageous, if the fed stack is continuously pushed into the conveying tube and if the pressure-gas pulses are applied at least approximately at periodic time intervals, so that a quasi-continuous isolation of the objects is effected. However, in general, no exact periodicity is given. Rather, the control unit controls the circulating speed of the feeding conveyor belt and the opening of the high-speed valve through the use of sensors for detecting the position of the fuel pellets and the pushing pins to make sure to avoid double separations, on one hand, and also so-called zero separations, on the other hand, in which spacings between the pushing pins remain empty, for lack of fuel pellets, which are not "supplied" quickly enough.

The advantages achieved with the invention reside, in particular, in that in an isolating plant, by purposefully charging objects fed in stacks, in particular nuclear fuel pellets for a nuclear plant, with pressure-gas pulses, a reliable and interruption-free isolation of each stack can be achieved, without requiring any mechanical interaction with any grippers, catches or handling instruments. Through a suitably chosen geometry of the pressure-gas feeding device and with a simple timing of the pressure pulses, the risk of zero or double separations can be excluded almost completely, even with a high conveying speed and a correspondingly high throughput. The linear course of motion without discrete changes in direction prevents an undesired change in orientation of the objects, for example from a lying into an upright orientation (in relation to the respective conveyor belt). By applying relatively short pressure pulses with little overpressure above the ambient atmosphere, a contamination of the ambient atmosphere with contaminants detached from the respective object or radioactive activities is avoided. In addition, the isolation process is extremely gentle to the material, which is an advantage, in particular, when handling relatively sensitive fuel pellets of compressed nuclear fuel.

Other features which are considered as characteristic for the invention are set forth in the appended claims.

Although the invention is illustrated and described herein as embodied in an isolating plant and an associated isolating method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
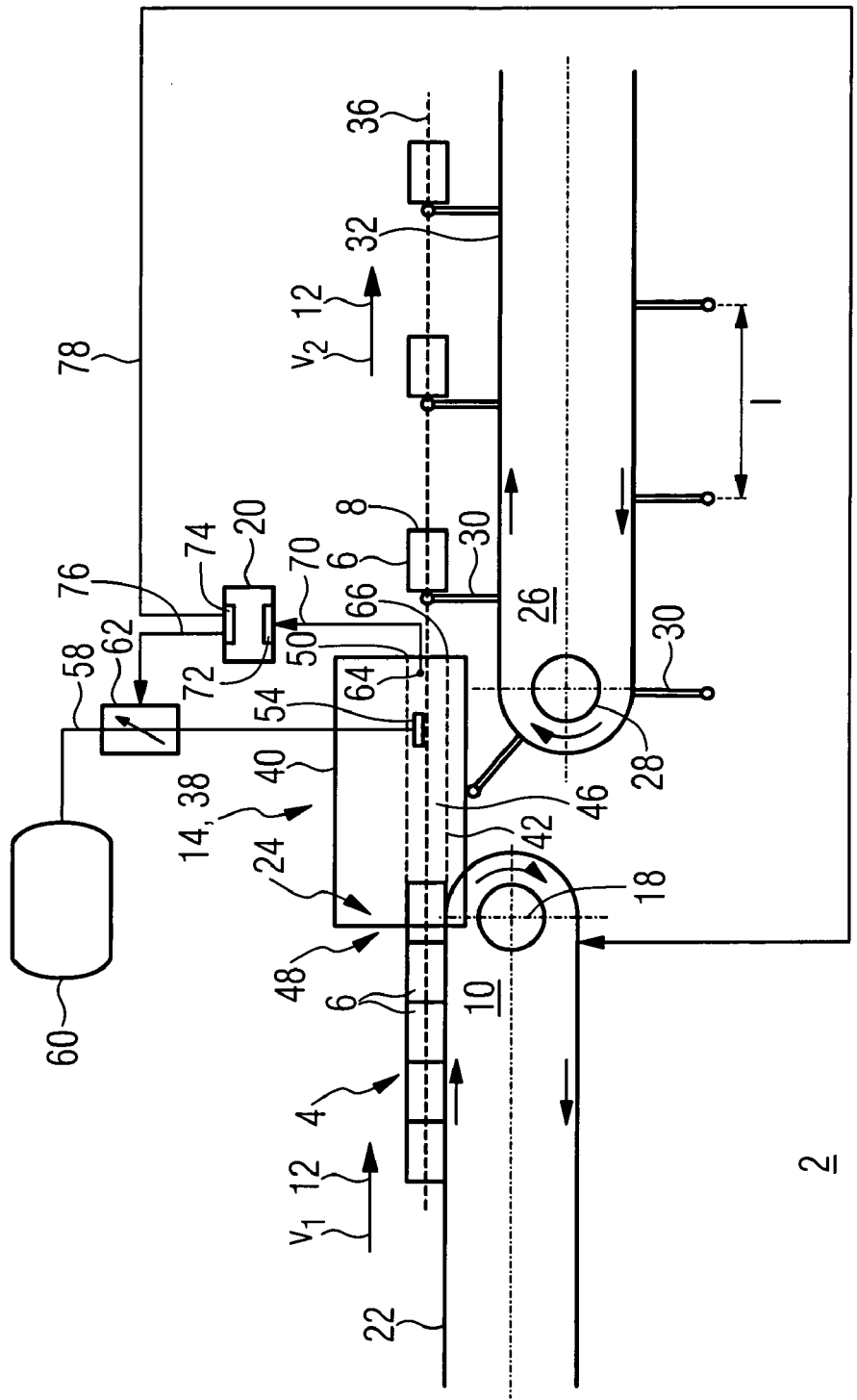
FIG. 1 is a highly diagrammatic, side-elevational view of an isolating plant for nuclear fuel pellets.
Figure 2:
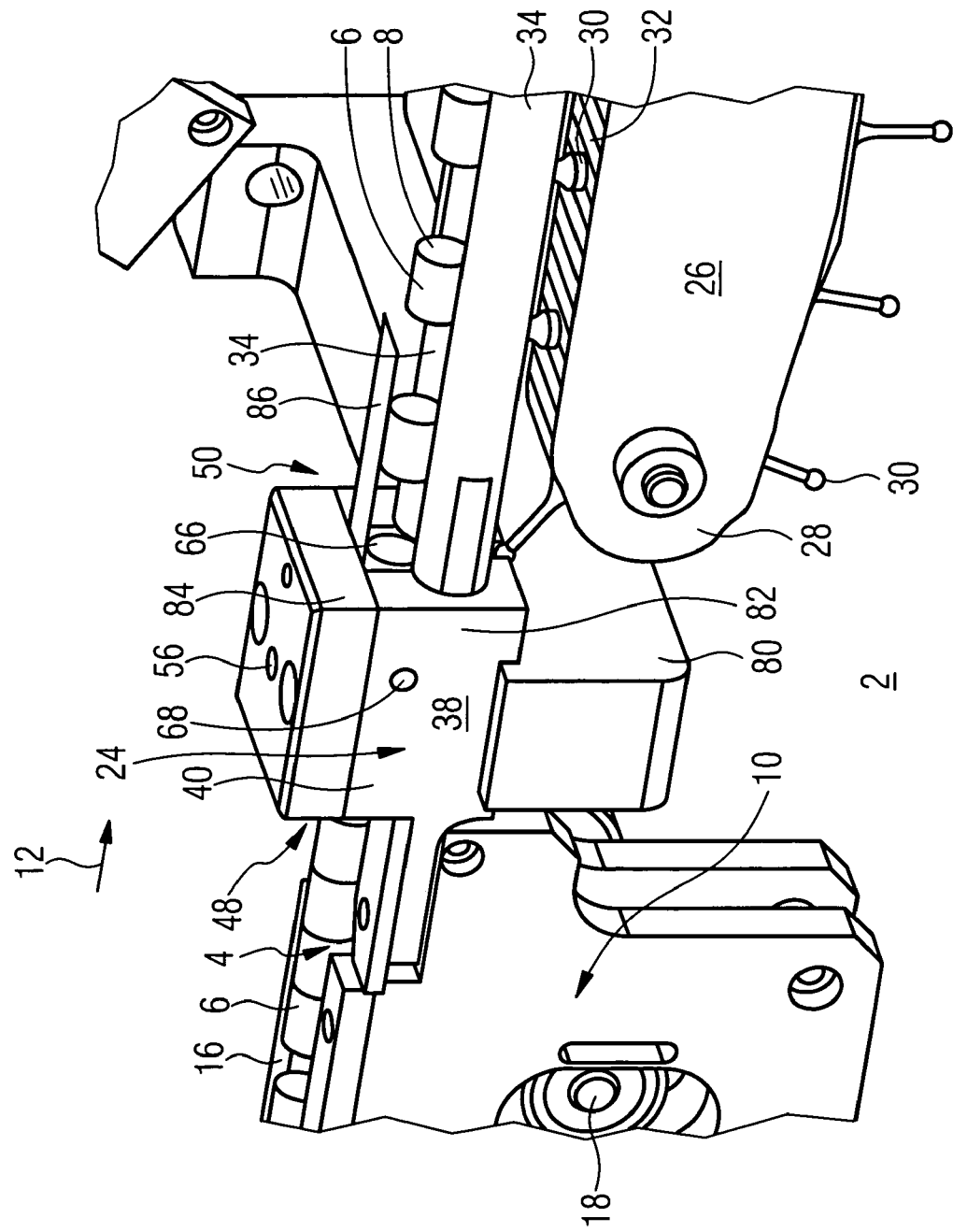
FIG. 2 is an enlarged, fragmentary and somewhat more detailed top-perspective view, from an angle, of the isolating plant according to FIG. 1.

Referring now in detail to the figures of the drawings, in which identical parts are identified by the same reference numerals, and first, particularly, to FIGS. 1 and 2 thereof, there is seen an isolating plant 2 which serves for isolating fuel pellets 6 made of compressed nuclear fuel, e.g. uranium dioxide, fed in groups in the form of coherent columns or stacks 4. Each of the individual fuel pellets 6 has a substantially cylindrical shape (with a mean diameter, e.g. of 9 mm and a length, e.g. of 11 mm), so that the stacks 4 can be formed thereof, in such a way that several fuel pellets 6 are lined up along their axis of symmetry one behind the other, with end faces 8 thereof adjoining each other.

In the isolating plant 2 according to FIG. 1 and FIG. 2, such a stack 4 is fed on a circulating feeding conveyor belt 10, in a lying position, in a conveying direction 12, to an isolating zone 14, with lateral guide rails 16 preventing the respective stack 4 from rolling away to the side. The feeding conveyor belt 10 is guided over at least two deflection pulleys 18, only one of which can be seen, however, in FIG. 1 and FIG. 2. At least one of the deflection pulleys is connected with a drive unit and thus serves as a driving roller. Through the use of a control unit 20, which will be described in more detail in the following, variable conveying speeds can be adjusted, which vary typically around an average value of $v_1=100$ mm/s. With this speed, a throughput rate of about ten fuel pellets 6 per second, fed to the isolating zone 14, can be achieved. The fuel pellets 6 are lying directly on a conveying surface 22 of the feeding conveyor belt 10 and are carried along by static friction.

The actual separation of the fuel pellets 6 which are fed in stacks is effected in a separating device 24, which is only shown in FIG. 1 in a diagrammatic manner and which will be described in more detail in the following. Afterwards, the fuel pellets 6 which are separated from each other will be taken away through the use of an output conveyor belt 26. The output conveyor belt 26 is constructed, like the feeding conveyor belt 10, as a conveyor belt being guided over at least two deflection pulleys and driven by a driving device which is not shown in detail. In this case, only one deflection pulley 28 can be seen. A constant conveying speed of, for example, $v_2=300$ mm/s is provided, which is thus about three times higher than the typical conveying speed of the feeding conveyor belt 10.

Contrary to the feeding conveyor belt 10, the output conveyor belt 26 includes pushing pins 30, which are fitted on the circulating belt at regular spacings. The pushing pins 30 are fitted on the belt in such a way that they always project vertically from the (outer) belt surface, even in the area of the deflection pulley 28. The (constant) distance between two successive pushing pins is, for example, I=15 mm or I=30 mm. Contrary to the feeding conveyor belt 10, the fuel pellets 6 have no direct contact with a belt surface 32 while being conveyed by the output conveyor belt 26. Rather they rest on two, for example cylindrical, sliding rails 34 disposed above the output conveyor belt 26 and aligned parallel to the latter. The two sliding rails 34 are parallel to each other and spaced apart just so far that, on one hand, the fuel pellets 6, which are already isolated and are sliding on them in a lying position, do not fall through a clearance and that, on the other hand, the pushing pins 30 project unhindered through the clearance between the sliding rails 34, in order to push the fuel pellets 6. Due to their shape, the sliding rails 34 also offer a lateral support.

The configuration and alignment of the feeding conveyor belt 10, the separating device 24, the output conveyor belt 26 and the sliding rails 34 is chosen in such a way that the fuel pellets 6 move during operation of the plant along a straight, horizontal trajectory 36 in the conveying direction 12. That means that the feeding conveyor belt 10 and the output conveyor belt 26 are disposed in a common longitudinal direction one behind the other and aligned in the same manner. Due to the guidance of the fuel pellets 6 on the sliding rails 34, provided on an output side of the separating device 24, the output conveyor belt 26 is located a little deeper or lower than the feeding conveyor belt 10.

Located between the two conveyor belts 10 and 26, i.e. more precisely, between end zones having the deflection pulleys 18 and 28, facing each other, there is a space which is also referred to hereinafter as the isolating zone 14 or a delivery area 38, where the separating device 24 is disposed. During operation of the plant, the feeding conveyor belt 10 transports the lying stacks 4 of fuel pellets 6 into the separating device 24 disposed in the delivery area 38. The stack 4 is successively separated in the separating device 24. The isolated fuel pellets 6 are then ejected by the separating device 24 on the other side and delivered one by one to the output conveyor belt 26, whereby the pushing pins 30 running around the deflection pulley 28 project from below into the spacings previously generated between the fuel pellets 6 sliding on the sliding rails 34 and push them ahead in the conveying direction 12. This simultaneously prevents the isolated fuel pellets 6 from approaching each other again in an undesired manner.

Figure 3:
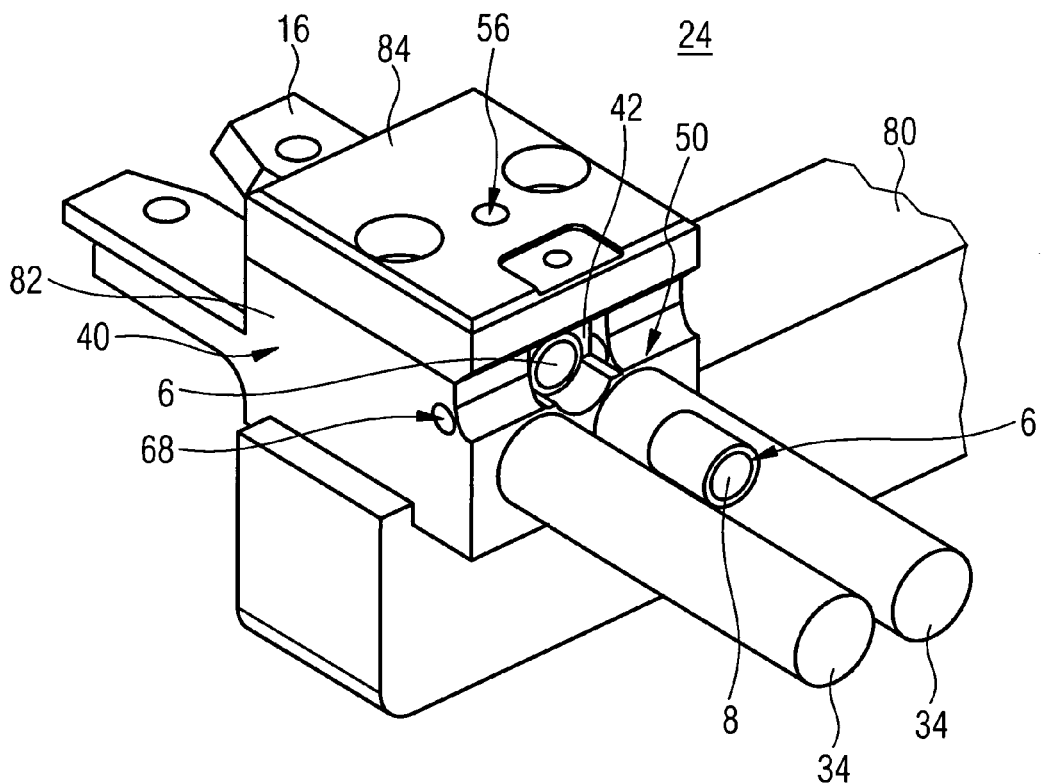
FIG. 3 is a further enlarged, fragmentary, perspective view of a portion of FIG. 2, namely of a pneumatic separating device.

In order to provide a particularly reliable and interruption-free separation of the fuel pellets 6, even at high throughput rates, the separating device 24, which is shown on an enlarged scale in FIG. 3, is based on a pneumatic action principle. A central element of the separating device 24 is a conveying tube 42 shown in an isolated manner in FIG. 4 without a surrounding housing block 40, which is oriented parallel to the conveying direction 12 in its mounting position.

The conveying tube 42 includes a cylindrical passage 46 inside an oblong parallelepiped 44 made of hardened steel or engineering ceramic. The fuel pellets 6 are pushed through the cylindrical passage 46 by the feeding conveyor belt 10 during operation of the plant. The diameter of the passage 46 is slightly larger than the diameter of the fuel pellets 6, so that they can be pushed through almost without friction and without a risk of "getting stuck," but in such a way that, nevertheless, when the fuel pellet 6 is inserted, a largely gas-tight closure or sealing of the passage 46 is achieved. The passage 46 may be expanded on an inlet side 48 in the manner of a funnel to guarantee an easy, self-centering insertion of the fuel pellets 6. The length of the conveying tube 42 is such that it is able to receive at least two fuel pellets 6 and even three fuel pellets 6, in the present exemplary embodiment.

Figure 4:
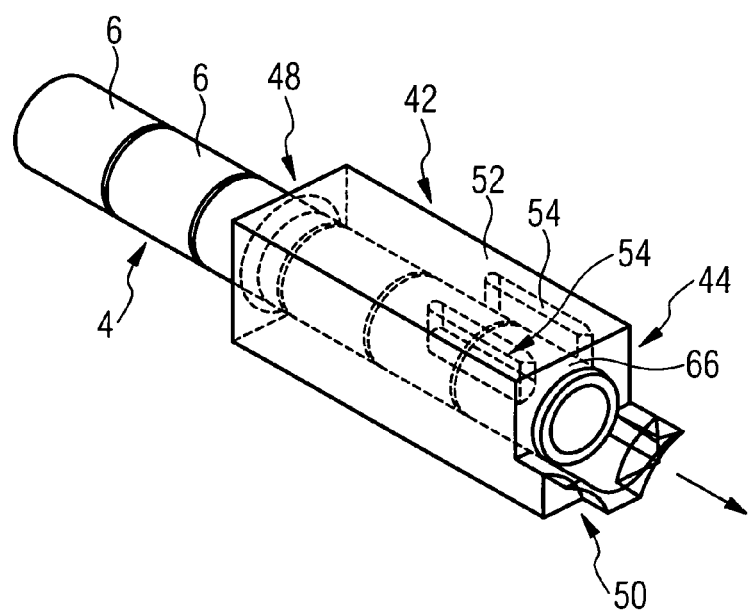
FIG. 4 is an even further enlarged, perspective view of a portion of FIG. 3, namely of a conveying tube for fuel pellets, shown without an enclosing housing, in contrast to FIG. 3.

The conveying tube 42 according to FIG. 4 includes a number of advantageously slot-shaped pressure-gas distribution openings or pressure-gas distribution slots 54 formed into a tube wall 52 in an end zone facing an outlet side 50. The pressure-gas distribution slots 54 can be charged with a pressurized gas through a pressure-gas line integrated in the housing block 40. In FIG. 3, only a connecting piece 56 of a line section, which is integrated in the housing block 40 and includes, if necessary, a number of branchings to the pressure-gas distribution slots 54, is visible. In the isolating plant according to FIG. 1 and FIG. 2, an external pressure-gas line 58 (only shown in FIG. 1) is connected to the connecting piece 56. The pressure-gas line 58 is in turn in connection with a pressure-gas reservoir 60 which, in the present exemplary embodiment, is a compressed-air reservoir. In the pressure-gas reservoir 60, a gas, in the present case compressed air, which is pressurized with 0.5 bar, for example, is stored. For this purpose, ambient air is sucked in, compressed by a compressor which is not shown herein, and fed into the pressure-gas reservoir 60 for intermediate storage.

In order to control the pressure-gas flow from the pressure-gas reservoir 60 to the pressure-gas distribution slots 54, a valve 62 actuated by a solenoid and constructed as a high-pressure solenoid valve, is inserted in the pressure-gas line 58 situated therebetween. Upon suitable selection, the otherwise completely closed valve 62 momentarily unblocks the flow passage, so that the pressure-gas distribution slots 54 and thus the fuel pellets 6 guided inside the conveying tube 42, are charged with a short pressure pulse. With a suitable configuration and dimensioning of the pressure-gas distribution slots 54 and a suitably chosen timing (moment of charging and duration) as well as pressure of the pressure pulses, this effects an acceleration of the fuel pellets 6, which in comparison with the remaining stack are relatively lightweight and freely movable in the conveying direction 12, at the front, output-side end of the conveying tube 42 in the conveying direction 12, i.e. towards the output conveyor belt 26.

That means that the fuel pellet 6 located at the end of the stack 4 in the conveying tube 42 is catapulted, so to speak, due to the tendency to expand of the pressure-gas penetrating through the pressure-gas distribution slots 54 into the conveying tube 42, out of the conveying tube 42 and onto the sliding rails 34 and, thus, placed between the pushing pins 30 of the output conveyor belt 26 circulating at a higher speed than the feeding conveyor belt 10. In this manner, the desired isolation of one fuel pellet 6 between each two successive pushing pins 30 is effected. As the stack 4 is continuously pushed forward, the feeding conveyor belt 10 and the output conveyor belt 26 circulate continuously, and the overall isolation process is effected, in spite of the discrete character of the individual pressure pulses, in a quasi-continuous manner. The exact position and the dimensions of the pressure-gas distribution slots 54 may vary. However, it should expediently be made sure that only the front-most fuel pellet 6 of the stack 4, as viewed in the conveying direction 12, is accelerated.

A peripheral notch or chamfer in the respective fuel pellet 6 in a margin area of its front and/or rear end face 8, facilitates the initial penetration of the pressure-gas into a gap or clearance between the front-most and the following fuel pellet 6. This assists the separation, especially in its first phase.

In order to detect the current position of the fed fuel pellets 6, a light barrier 64 of a synchronization device is provided in the isolating plant 2 according to FIG. 1 and FIG. 2. In the present exemplary embodiment, the light barrier 64 is disposed in such a way that its light beam is interrupted, as soon as the front end face 8 of the front-most fuel pellet 6 of the stack 4 pushed into the conveying tube 42, as viewed in conveying direction 12, reaches an outlet opening 66 of the conveying tube 42. The exact positioning of the light beam can, however, if necessary, also be chosen differently. A light source (transmitter) and a light sensor (receiver) of the light barrier 64 as well as, if necessary, a reflector, which are present in the case of reflex light barriers, are not drawn in FIG. 2 and FIG. 3, for the sake of simplicity. However, a cylindrical recess 68 in the housing block 40 is visible, through which the light beam of the light barrier 64 is guided.

As can be seen in the diagrammatic representation according to FIG. 1, a sensor of the light barrier 64 is connected over a signal line 70 with a signal input 72 of the electronic control unit 20. The control unit 20 processes this input signal, possibly together with input signals of further sensors, according to a previously fixed control algorithm, and transmits suitable control signals over a control-signal line 76 connected to a signal output 74, to the actuating unit of the valve 62 disposed in the pressure-gas line 58. Further input signals, possibly taken into account for the selection of the valve 62, may come, for example, from non-illustrated sensors or light barriers of the synchronization device for position detection of the pushing pins 30 on the output conveyor belt 26. Furthermore, a control of the circulating speed $v_1$ of the feeding conveyor belt 10 and/or of the circulating speed $v_2$ of the output conveyor belt 26 through the use of the above-mentioned, and possibly further, input quantities, can be provided. For this purpose, the control unit 20 acts upon the drive unit, which is not shown herein in detail, of the respective conveyor belt 10, 26, through its signal output 74 and through a control-signal line 78 connected to the signal output 74.

As can be seen, e.g., in FIG. 3, the housing block 40 of the separating device 24 is supported by a support 80 and expediently includes a lower part 82 receiving the conveying tube 42 and an upper part 84 detachably connected with the lower part. When the upper part 84 is removed, the conveying tube 42 can easily be taken out of the lower part 82 and exchanged, as required, e.g. for a conveying tube 42 with another diameter of the passage 46, for example if fuel pellets 6 of other dimensions are to be processed.

As can be seen in FIG. 2, a steel sheet 86 or the like can be disposed on the outlet side 50 of the separating device 24, for preventing the fuel pellets 6 catapulted out of the conveying tube 42 from being pushed out of the guide rails upwards by error due to incorrectly positioned pushing pins 30.

The invention has been described above in connection with the manufacture and inspection of nuclear fuel pellets 6. However, it is not restricted to this field of application. Rather other application possibilities in other industrial production processes are also imaginable, in which a reliable separation of preferably cylindrical objects fed in stacks is important. It will be possible, if necessary, to isolate even objects with a non-cylindrical cross-section by accordingly adapting the passage 46 of the conveying tube 42.

The invention claimed is:

1. An isolating plant for isolating nuclear fuel pellets fed in stacks, the isolating plant comprising:
    a feeding device including a feeding conveyor belt;
    an output device including an output conveyor belt;
    a delivery area disposed between said feeding device and said output device;
    a separating device disposed in said delivery area, driven by a pressure gas and configured to separate the fed nuclear fuel pellets from each other during operation of the plant with pressure-gas pulses and to deliver the nuclear fuel pellets one by one to said output device, said separating device including a conveying tube through which the nuclear fuel pellets to be isolated are passed during operation of the plant, said conveying tube having a tube wall and a number of pressure-gas distribution slots formed into said tube wall and connected to said pressure-gas line;
    a pressure-gas source;
    a pressure-gas line connected from said pressure-gas source to said separating device;

a valve disposed in said pressure-gas line; and a synchronization device synchronizing said valve with a movement of the nuclear fuel pellets on said feeding device.

2. The isolating plant according to claim 1, wherein said conveying tube has an end zone facing said output device, and said pressure-gas distribution slots are disposed in said end zone.

3. The isolating plant according to claim 1, wherein said pressure-gas distribution slots are disposed and dimensioned to cause the applied pressure-gas pulses to always accelerate, in a conveying direction, only a front-most nuclear fuel pellet of a fed stack in said conveying direction, thus separating the front-most nuclear fuel pellet from the stack.

4. The isolating plant according to claim 1, wherein said valve is a high-speed solenoid valve configured to realize pressure-gas pulses having a duration in a range between 1 ms and 50 ms.

5. The isolating plant according to claim 1, wherein said synchronization device includes a light barrier having a light path being interrupted during operation of the plant by the nuclear fuel pellets coming out of an output side of said conveying tube.

6. The isolating plant according to claim 5, wherein said output conveyor belt includes a plurality of pushing pins disposed at regular spacings from each other and between which the isolated nuclear fuel pellets are placed during operation of the plant.

7. The isolating plant according to claim 6, wherein said synchronization device includes a position detector detecting an instantaneous position of the pushing pins.

8. A method for isolating nuclear fuel pellets, the method comprising the following steps:

feeding the nuclear fuel pellets in stacks on a feeding conveyor belt of a feeding device;

pushing a stack of the nuclear fuel pellets through a conveying tube having a tube wall with a number of pressure-gas distribution slots connected to a pressure-gas line;

separating the nuclear fuel pellets from the stack by charging the pressure-gas distribution slots with pressure-gas pulses; and individually accelerating the nuclear fuel pellets along a longitudinal direction of the conveying tube.

9. The method according to claim 8, which further comprises:

continuously pushing the fed stack into the conveying tube; and applying the pressure-gas pulses at least approximately at periodic time intervals, effecting a quasi-continuous isolation of the nuclear fuel pellets.

* * * * *